United States Patent
Hassner et al.

(10) Patent No.: US 7,131,052 B2
(45) Date of Patent: Oct. 31, 2006

(54) ALGEBRAIC DECODER AND METHOD FOR CORRECTING AN ARBITRARY MIXTURE OF BURST AND RANDOM ERRORS

(75) Inventors: Martin Aureliano Hassner, Mountain View, CA (US); Tetsuya Tamura, Kanagawa (JP); Barry Marshall Trager, Yorktown Heights, NY (US); Shmuel Winograd, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 10/217,728

(22) Filed: Aug. 12, 2002

(65) Prior Publication Data

US 2004/0030737 A1     Feb. 12, 2004

(51) Int. Cl.
  *H03M 13/03*   (2006.01)
(52) U.S. Cl. .................. 714/787; 714/752; 714/762
(58) Field of Classification Search ............... 714/787, 714/762, 785, 752, 763, 761
  See application file for complete search history.

(56) References Cited

U.S. PATENT DOCUMENTS

| | | | |
|---|---|---|---|
| 4,291,406 A | 9/1981 | Bahl et al. ................... 371/44 |
| 4,357,702 A | 11/1982 | Chase et al. .................. 371/1 |
| 4,413,340 A | 11/1983 | Odaka et al. ................. 371/39 |
| 4,916,702 A * | 4/1990 | Berlekamp .................. 714/762 |
| 4,951,284 A * | 8/1990 | Abdel-Ghaffar et al. .... 714/761 |
| 5,206,864 A | 4/1993 | McConnell ................ 371/37.4 |
| 5,321,703 A | 6/1994 | Weng ........................... 371/36 |
| 5,377,208 A | 12/1994 | Schneider-Obermann et al. ......................... 371/38.1 |
| 5,420,873 A | 5/1995 | Yamagishi et al. ......... 371/38.1 |
| 5,517,509 A * | 5/1996 | Yoneda ....................... 714/785 |
| 5,661,760 A * | 8/1997 | Patapoutian et al. ........ 375/341 |
| 5,694,330 A | 12/1997 | Iwamura et al. ............ 364/496 |
| 5,712,861 A * | 1/1998 | Inoue et al. ................. 714/752 |
| 5,781,567 A * | 7/1998 | Sako et al. .................. 714/762 |
| 5,864,440 A | 1/1999 | Hashimoto et al. ........... 360/53 |
| 5,946,328 A | 8/1999 | Cox et al. ................. 371/37.11 |
| 6,321,357 B1 * | 11/2001 | Ouyang ....................... 714/762 |
| 6,651,213 B1 * | 11/2003 | Hassner et al. ............. 714/763 |
| 6,678,859 B1 * | 1/2004 | Senshu ........................ 714/761 |

FOREIGN PATENT DOCUMENTS

JP       63014381       1/1988

OTHER PUBLICATIONS

N. Kamiya, "A Unified Algorithm for Solving Key Equations for Decoding Alternant Codes," IEICE Trans. Fundamentals, vol. E82-A, No. 10, Oct. 1999.

(Continued)

*Primary Examiner*—Guy Lamarre
*Assistant Examiner*—Fritz Alphonse
(74) *Attorney, Agent, or Firm*—Samuel A. Kassatly

(57) ABSTRACT

An error correction algebraic decoder and an associated method correct a combination of a B-byte burst of errors and t-byte random errors in a failed sector, by iteratively adding and removing an erasure (N−B) times until the entire failed sector has been scanned, provided the following inequality is satisfied: $(B+2t) \leq (R-1)$, where N denotes the number of bytes, B denotes the length of the burst of errors, t denotes the total number of random errors, and R denotes the number of check bytes in the failed sector. This results in a corrected sector at a decoding latency that is a generally linear function of the number of the check bytes R, as follows: Decoding Latency=$5R(N-B)$.

37 Claims, 11 Drawing Sheets

OTHER PUBLICATIONS

N. Tan et al., "Correcting a Specified Set of Likely Error Patterns," IEEE Transactions on Information Theory, vol. 41, No. 1, Jan. 1995, pp. 272-279.

R. Roth, "Reduced-Redundancy Product Codes for Burst Error Correction," IEEE Transactions on Information Theory, vol. 44, No. 4, Jul. 1998, pp. 1395-1406.

J. Chen et al., "A Burst-Error-Correcting Algorithm for Reed-Solomon Codes," IEEE Transactions on Information Theory, vol. 38, No. 6, Nov. 1992, pp. 1807-1812.

P. Owsley, "Burst Error Correction Extensions for Reed Solomon Codes," dissertation for the Degree of Doctor of Philosophy, Jul. 7, 1988.

* cited by examiner

510

CALCULATE SYNDROME POLYNOMIAL — 700

$$S(x) := \sum_{i=0}^{R-1} s_i x^{R-1-i}$$

CALCULATE ERASURE POLYNOMIAL — 715

$$E(x) := \prod_{i=0}^{R-1}(x - \alpha^i)$$

CALCULATE MODIFIED SYNDROME POLYNOMIAL — 720

$$S(x)_E := [E(x) * S(x)] \bmod x^R$$

MODIFIED SYNDROME POLYNOMIAL — 730

ALGEBRAIC DECODER AND METHOD FOR CORRECTING AN ARBITRARY MIXTURE OF BURST AND RANDOM ERRORS

CROSS-REFERENCE TO RELATED APPLICATION

The present application is related to co-pending U.S. patent application, titled "Multiple Level (ML), Integrated Sector Format (ISF), Error Correction Code (ECC) Encoding And Decoding Processes For Data Storage Or Communication Devices And Systems," Ser. No. 10/040,115, filed on Jan. 3, 2002, which is assigned to the same assignee as the present application.

FIELD OF THE INVENTION

The present invention relates to the field of data storage, and particularly to error correcting systems and methods employing an error correction algebraic decoder. More specifically, this invention relates to an improved algebraic decoder and associated method for correcting an arbitrary mixture of B-byte burst errors and t-byte random errors, provided that (B+2t) is less than, or equal to (R−1), where R denotes the number of check bytes, resulting in a decoding latency that is a linear function of the number of check bytes.

BACKGROUND OF THE INVENTION

The use of cyclic error correcting codes in connection with the storage of data in storage devices is well established and is generally recognized as a reliability requirement for the storage system. Generally, the error correcting process involves the processing of syndrome bytes to determine the location and value of each error. Non-zero syndrome bytes result from the exclusive-ORing of error characters that are generated when data is read from the storage medium.

The number of error correction code (ECC) check characters employed depends on the desired power of the code. As an example, in many present day ECC systems used in connection with the storage of 8-bit bytes in a storage device, two check bytes are used for each error to be corrected in a codeword having a length of at most 255 byte positions. Thus, for example, six check bytes are required to correct up to three errors in a block of data having 249 data bytes and six check bytes. Six distinctive syndrome bytes are therefore generated in such a system. If there are no errors in the data word comprising the 255 bytes read from the storage device, then the six syndrome bytes are the all zero pattern. Under such a condition, no syndrome processing is required and the data word may be sent to the central processing unit. However, if one or more of the syndrome bytes are non-zero, then syndrome processing involves the process of identifying the location of the bytes in error and further identifying the error pattern for each error location.

The underlying mathematical concepts and operations involved in normal syndrome processing operations have been described in various publications. These operations and mathematical explanations generally involve first identifying the location of the errors by use of what has been referred to as the "error locator polynomial". The overall objective of the mathematics involved employing the error locator polynomial is to define the locations of the bytes in error by using only the syndrome bytes that are generated in the system.

The error locator polynomial has been conventionally employed as the start of the mathematical analysis to express error locations in terms of syndromes, so that binary logic may be employed to decode the syndrome bytes into first identifying the locations in error, in order to enable the associated hardware to identify the error patterns in each location. Moreover, error locations in an on-the-fly ECC used in storage or communication systems are calculated as roots of the error locator polynomial.

A specific concern facing the data storage industry is the combination of poor read/write conditions and low signal-to-noise ratio data detection that are likely to cause read hard errors. A read hard error is comprised of an arbitrary mixture of B-byte burst errors and t-byte random errors in data sectors stored on a disk or data storage medium.

Typically, byte-alphabet, Reed-Solomon codes are used to format the stored sector data bytes into codewords, protected by redundant check bytes and used to locate and correct the byte errors in the codewords. Long codewords are more efficient for data protection against long bursts of errors as th redundant check byte overhead is averaged over a long data block. However, in data storage devices, long codewords cannot be used, unless a read-modify-write process is used because the logical unit data sector is 512 bytes long and the computer operating system assumes a 512-byte long sector logical unit. Each read-modify-write process causes a loss of a revolution of the data storage medium. Losing revolutions of the data storage medium lowers the input/output (I/O) command throughput. Therefore, frequent usage of the read-modify-write process becomes prohibitive.

Rather than uniformly adding check bytes to short codewords to correct more random errors in the short codewords, a method has been proposed for generating check bytes that are not rigidly attached to a short codeword but are shared by several short codewords in an integrated sector Reed-Solomon Error Correction Coding (ECC) format.

The combination of low signal to noise ratio and poor read/write conditions may result in both random errors as well as long bursts of byte errors ("mixed error mode") becoming more and more likely at high areal densities and low flying heights, which is the trend in HDD industry. The occurrence of such mixed error mode combinations of random as well as burst errors is likely to cause the 512-byte sector interleaved on-the-fly ECC to fail, resulting in a more frequent use of a data recovery procedure that involves rereads, moving the head, etc.

These data recovery procedures result in the loss of disk revolutions, which, in turn, causes a lower input/output throughput. This performance loss is not acceptable in many applications such as audio-visual (AV) data transfer, for example, which will not tolerate frequent interruptions of video data streams. On the other hand, uniform protection of all single sectors against both random as well as burst errors, at the 512-byte logical unit sector format, would result in excessive and unacceptable check byte overheads. Such check byte overheads also increase the error rate due to the increase in linear density of the data.

Furthermore, the decoding latency, is typically a function of the square of the number of the check bytes ($R^2$), which could further decrease the throughput performance of the storage system.

Therefore, it would be desirable to have an algebraic decoder and associated method for correcting an arbitrary mixture of burst errors and random errors with an improved decoding latency. The decoder is not limited to a specific number of random errors, such as 1 or 2 random errors. Further, the decoding latency should be a linear function of the overhead as compared to a conventional quadratic latency function (e.g., in the case of 2 random errors).

SUMMARY OF THE INVENTION

In accordance with the present invention, an error correction algebraic decoder and an associated method provide the capability to correct all combinations of burst errors (B) and random errors (t), provided that (B+2t) is less than, or equal to (R−1), wherein R denotes the number of check bytes, resulting in a decoding latency that is a linear function of the number of check bytes.

The above and other features of the present invention are realized by an error correction (ECC) algebraic decoder and associated method that correct a combination of a B-byte burst of errors and t-byte random errors in a failed sector, by iteratively adding and removing an erasure (N−B) times until the entire failed sector has been scanned, provided the following inequality is satisfied: (B+2t)≦(R−1), where N denotes the number of bytes, B denotes the length of the burst of errors, t denotes the total number of random errors, and R denotes the number of check bytes in the failed sector. This results in a corrected sector at a decoding latency that is a generally linear function of the number of the check bytes R, as follows: Decoding Latency=5R(N−B).

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 7 is a more detailed functional flow chart that illustrates an initialization stage in the decoding process of FIG. 5;

DETAILED DESCRIPTION OF PREFERRED EMBODIMENTS

Figure 1:
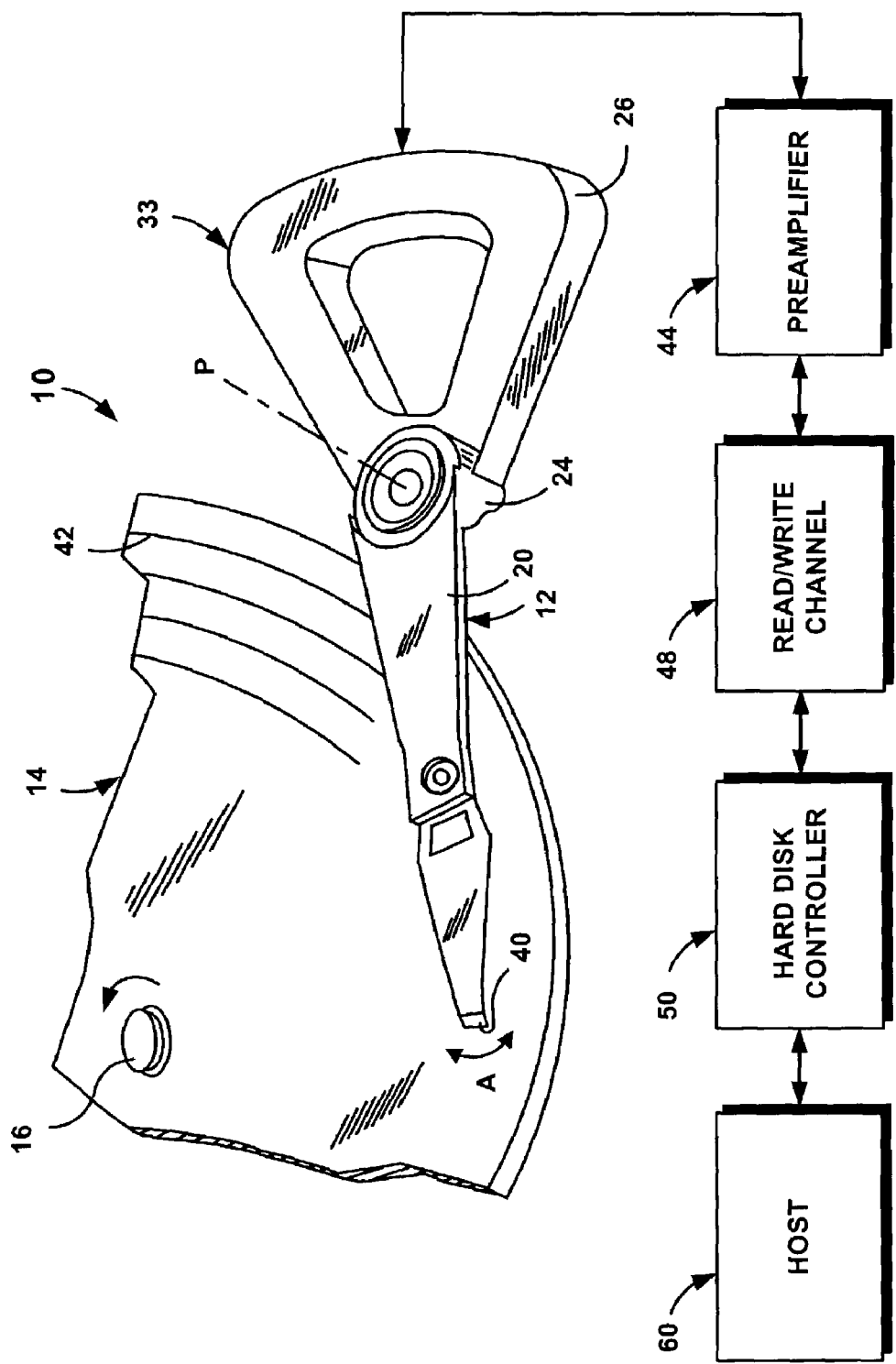
FIG. 1 is a schematic illustration of a data storage system such as a disk drive that applies a mixed mode burst/random error decoding process according to the present invention.

FIG. 1 illustrates a disk drive 10 comprised of a head stack assembly 12 and a stack of spaced apart magnetic, optical and/or MO data storage disks or media 14 that are rotatable about a common shaft 16. The head stack assembly 12 includes a number of actuator arms 20 that extend into spacings between the disks 14, with only one disk 14 and one actuator arm 20 being illustrated for simplicity of illustration. The disk drive 10 further includes a preamplifier 44, a read/write channel 48, and a hard disk controller 50.

The head stack assembly 12 also includes an E-shaped block 24 and a magnetic rotor 26 attached to the block 24 in a position diametrically opposite to the actuator arms 20. The rotor 26 cooperates with a stator (not shown) for the actuator arms 20 to rotate in a substantially radial direction, along an arcuate path in the direction of an arrow A. Energizing a coil of the rotor 26 with a direct current in one polarity or the reverse polarity causes the head stack assembly 12, including the actuator arms 20, to rotate around axis P in a direction substantially radial to the disks 14. A head disk assembly 33 is comprised of the disks 14 and the head stack assemblies 12.

A transducer head 40 is mounted on the free end of each actuator arm 20 for pivotal movement around axis P. The magnetic rotor 26 controls the movement of the head 40 in a radial direction, in order to position the head 40 in registration with data information tracks or data cylinders 42 to be followed, and to access particular data sectors on these tracks 42.

Numerous tracks 42, each at a specific radial location, are arrayed in a concentric pattern in a magnetic medium of each surface of data disks 14. A data cylinder includes a set of corresponding data information tracks 42 for the data surfaces of the stacked disks 14. Data information tracks 42 include a plurality of segments or data sectors, each containing a predefined size of individual groups of data records that are saved for later retrieval and updates. The data information tracks 42 can be disposed at predetermined positions relative to a servo reference index.

Figure 2:
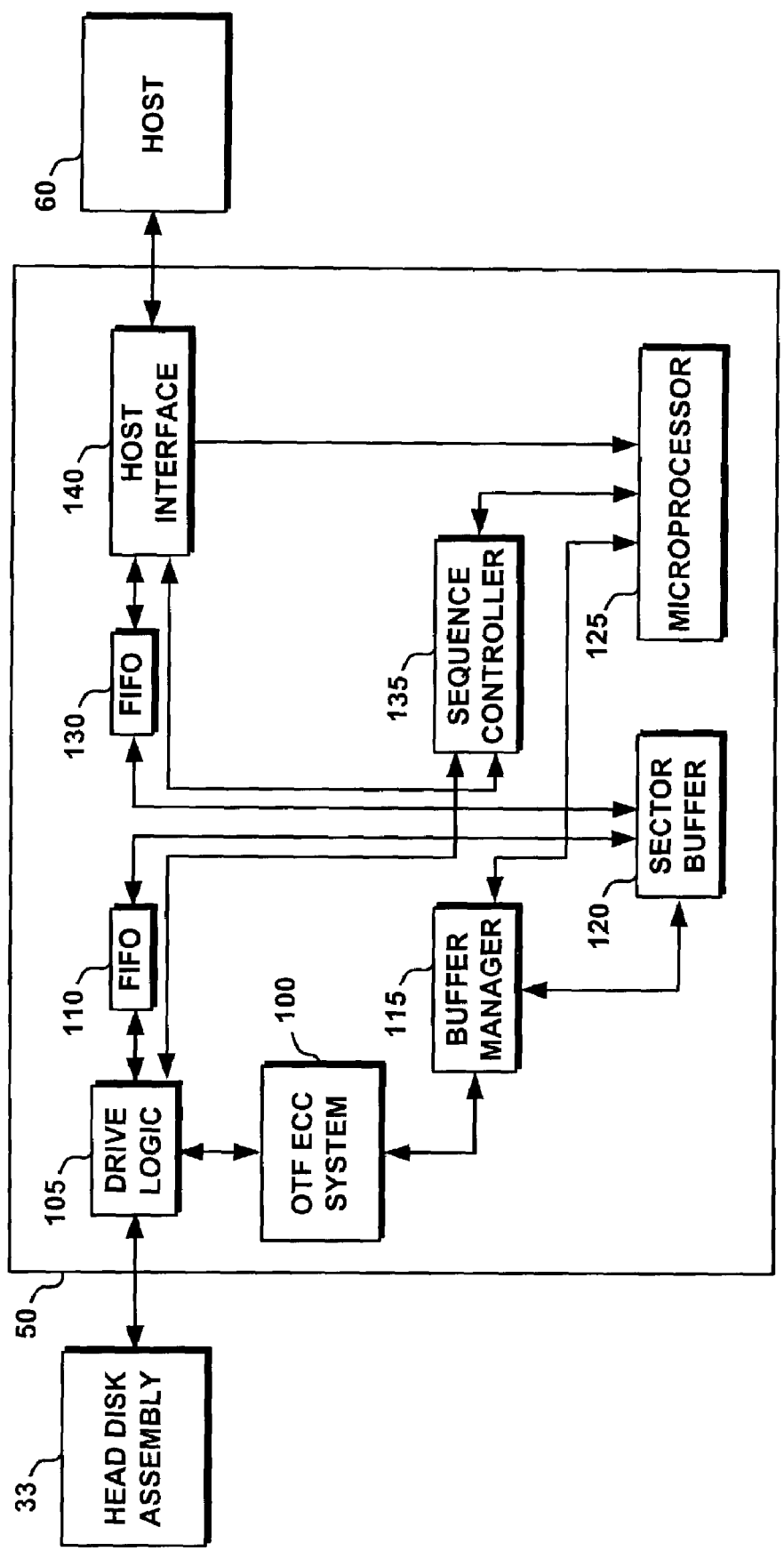
FIG. 2 is an exemplary block diagram detailing the architecture of a buffered hard disk controller that forms part of the disk drive system of FIG. 1.

FIG. 2 illustrates an exemplary architecture of a buffered hard disk controller 50 that comprises an on-the-fly (OTF) error correction code (ECC) system (or module) 100 that includes a mixed mode burst/random error decoder 200 (shown in FIG. 4 and referred to herein as "decoder"), for implementing the on-the-fly error correction code according to the present invention. It should be clear that the present invention is not limited to this specific architecture and that it can be applied by, or in conjunction with other architectures.

The hard drive controller 50 includes a logic drive circuit 105 that formats data from the hard disk assembly 33, for example from 8 bits to 32 bits. A FIFO register 110 stores the formatted data and exchanges the same with a sector buffer 120. The ECC system 100 receives the formatted data from the drive logic circuit 105 and performs the error correction coding algorithm of the present invention, as described herein.

A buffer manager 115 controls data traffic between the ECC system 100, a sector buffer (i.e., random access memory) 120, and a microprocessor 125. Another FIFO register 130 stores data and exchanges the same with the sector buffer 120. A sequence controller 135 is connected between the drive logic circuit 105, the microprocessor 125, and a host interface 140, to control the sequence operation of the data traffic and various commands across the hard drive controller 50. The host interface 140 provides an interface between the hard drive controller 50 and a host 60 (FIG. 1).

Figure 3:
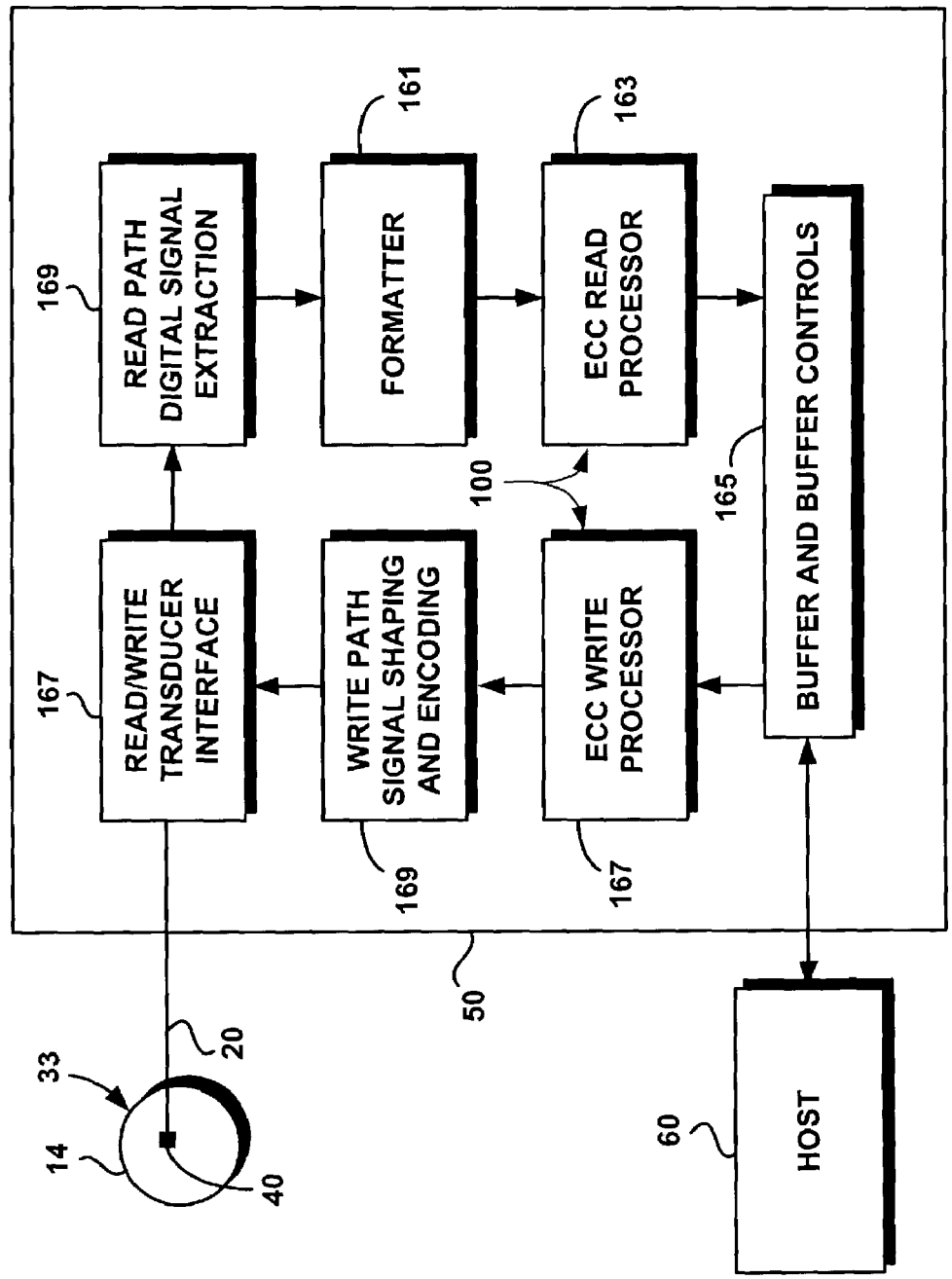
FIG. 3 is a high level block diagram of the data storage system of FIG. 1, depicting data flow along a read channel and a write channel of the hard drive controller of FIG. 2, and illustrating an exemplary error correction code system comprised of an ECC read processor and an ECC write processor.

FIG. 3 represents a block diagram of the hard disk controller 50 of FIG. 2 that includes an on-the-fly error correction code system 100 comprised of an ECC read processor 163 and an ECC write processor 167. When sequences of digital binary data are to be written onto the disk 14, they are placed temporarily in a buffer 165 and subsequently processed and transduced along a write path or channel (157, 167 and 169).

First, a predetermined number of binary data elements, also termed bytes, in a data string are moved from the buffer 165 and streamed through an ECC write processor 167. In the ECC write processor 167, the data bytes are mapped into codewords drawn from a Reed-Solomon code. Next, each codeword is mapped in a write path signal-shaping unit 169 into a run length limited or other bandpass or spectral-shaping code and changed into a time-varying signal. The write path signal-shaping unit 169 includes an encoder 202 (FIG. 4) for encoding the signals as described herein. The time-varying signal is applied through an interface read/write transducer interface 157 and thence to the write element in a magnetoresistive or other suitable transducer head 40 for conversion into magnetic flux patterns.

All the measures starting from the movement of the binary data elements from buffer 165 until the magnetic flux patterns are written on a selected disk track 42 (FIG. 1) as the rotating disk 14 passes under the head 40 are synchronous and streamed. For purposes of efficient data transfer, the data is destaged (written out) or staged (read) a disk sector at a time. Thus, both the mapping of binary data into Reed-Solomon codewords and the conversion to flux producing time-varying signals must be done well within the time interval defining a unit of recording track length moving under the transducer. Typical units of recording track length are equal fixed-length byte sectors of 512 bytes.

When sequences of magnetic flux patterns are to be read from the disk 14, they are processed in a read path or channel (157, 159, 161, and 163) and written into the buffer 165. The time-varying signals sensed by transducer 40 are passed through the read/write transducer interface 157 to a digital signal extraction unit 159. Here, the signal is detected and a decision is made as to whether it should be resolved as a binary 1 or 0. As these 1's and 0's stream out of the signal extraction unit 159, they are arranged into codewords in the formatting unit 11.

Since the read path is evaluating sequences of Reed Solomon codewords previously recorded on the disk 14, then, absent error or erasure, the codewords should be the same. In order to test whether that is the case, each codeword is applied to an ECC read processor 163 over a path from a formatter 161. Also, the output from the ECC processor 163 is written into buffer 165. The read path also operates in a synchronous datastreaming manner such that any detected errors must be located and corrected within the codeword well in time for the ECC read processor 163 to receive the next codeword read from the disk track 42. The buffer 165 and the read and write channels may be monitored and controlled by the microprocessor 125 (FIG. 2) to ensure efficacy where patterns of referencing may dictate that a path not be taken down, such as sequential read referencing.

Having described the general environment in which the ECC system 100 of the present invention operates, the decoder 200, forming part of the ECC system 100, and its associated decoding method (depicted in FIG. 5) will now be described in more detail. Each of the ECC read processor 163 and the ECC write processor 167 includes a decoder 200 that can be applied in hardware using digital logic.

Figure 4:
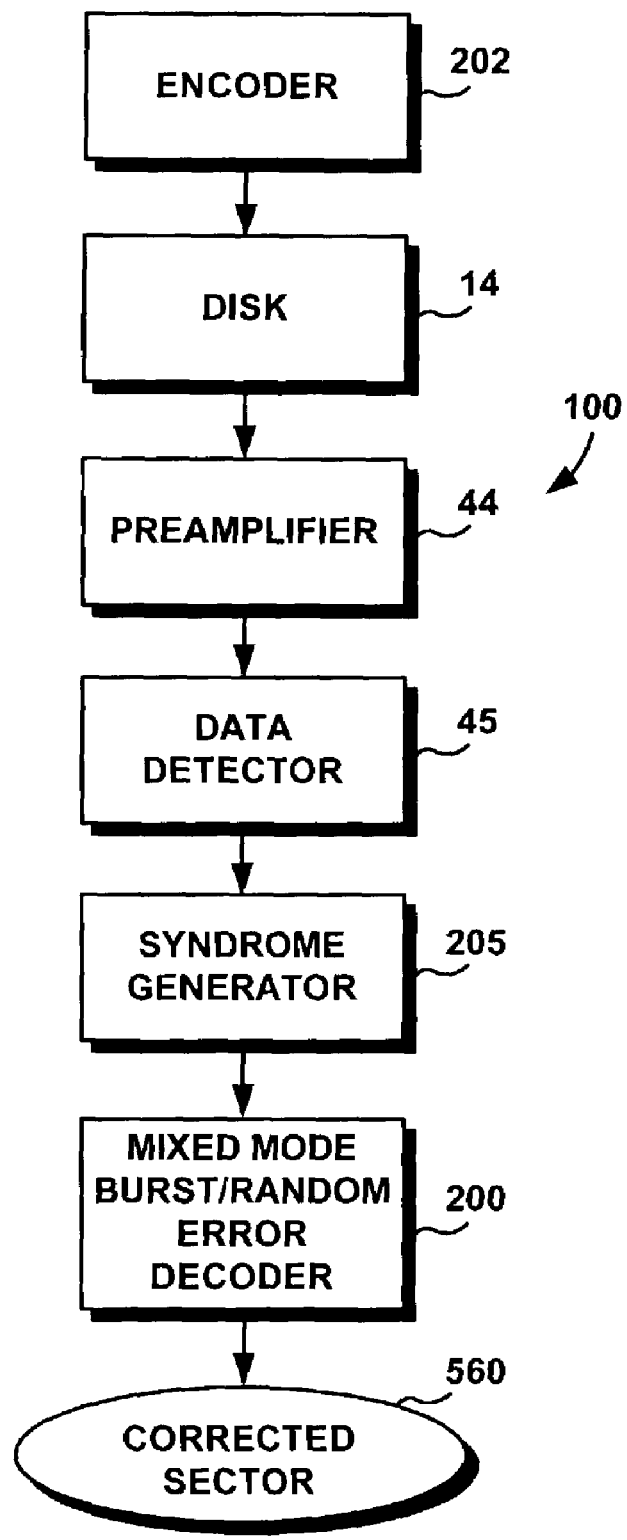
FIG. 4 is a block diagram of the data storage system of FIG. 1, detailing the main components of an ECC module that forms part of the ECC read processor and the ECC write processor of FIG. 3, illustrating a mixed mode burst/random error decoder of the present invention.

The main components of the ECC system 100 are illustrated in FIG. 4. The ECC system 100 includes several functional units such as the encoder 202, the preamplifier 44, a data detector 45 that converts the analogue waveform at the output of the preamplifier 44 to bits, a syndrome generator 205, and the decoder 200 of the present invention. In summary, the syndrome generator 205 feeds the syndromes to the decoder 200, which, in turn, applies the decoding method 500 of FIG. 5 to automatically generate a corrected sector 560 within an optimal decoding latency.

In operation, and with reference to the decoding method 500 of FIG. 5, the decoder 200 receives the syndromes from the syndrome generator 205 (FIG. 4) and starts the initialization stage 510, to generate a modified syndrome polynomial 730, as it will be described in more detail in connection with FIG. 7. Decoding method 500 then iteratively removes (R−B) erasures at step 515, and further calculates an error locator polynomial 830 at step 520, as it will be explained in connection with FIG. 8.

At step 530, method 500 inquires if the error locator polynomial 830 is valid, that is if the error locator polynomial 830 has distinct roots located within the range of admissible byte locations within the sector. If the error locator polynomial 830 is determined to be valid, the decoder 200 adds this error locator polynomial 830 to a solution list at step 540. Then, method 500 proceeds to step 600 where the decoder 200 removes and adds erasures as explained in FIG. 6. If, however, method 500 determines at step 530 that the error locator polynomial 830 is not valid, it proceeds to step 600 without adding this error locator polynomial to the solution list.

Following the iterative erasure removal and addition step 600, the decoder 200 performs a cyclic redundancy check (CRC) at step 555, selecting a valid burst and error locator as well as respective error values, to produce a corrected sector 560.

The initialization stage 510 will now be described in relation to FIG. 7. Using the inputted syndromes, the decoder 200 starts at step 700 by calculating an erasure polynomial S(x), as follows:

$$S(x) := \sum_{i=0}^{R-1} s_i x^{R-1-i}, \qquad (1)$$

where "R" is the number of checks or check bytes in the sector; "i" denotes an index that goes from 0 to (R−1); and $S_i$ denotes an $i^{th}$ syndrome.

The initialization method 510 also calculates an erasure polynomial E(x) at step 715, as follows, assuming the first R bytes in the sector to be erased:

$$E(x) := \prod_{i=0}^{R-1} (x - \alpha^i), \qquad (2)$$

where $\alpha^i$ refers to a known Galois Field representation of symbol values and locations, and where the value "i" varies between 0 and R−1.

In addition, the initialization method 510 further calculates a modified syndrome polynomial $S(x)_E$ at step 720, as follows:

$$S(x)_E := [E(x)*S(x)] \bmod x^R, \quad (3)$$

resulting in the modified syndrome polynomial 730.

Figure 8:
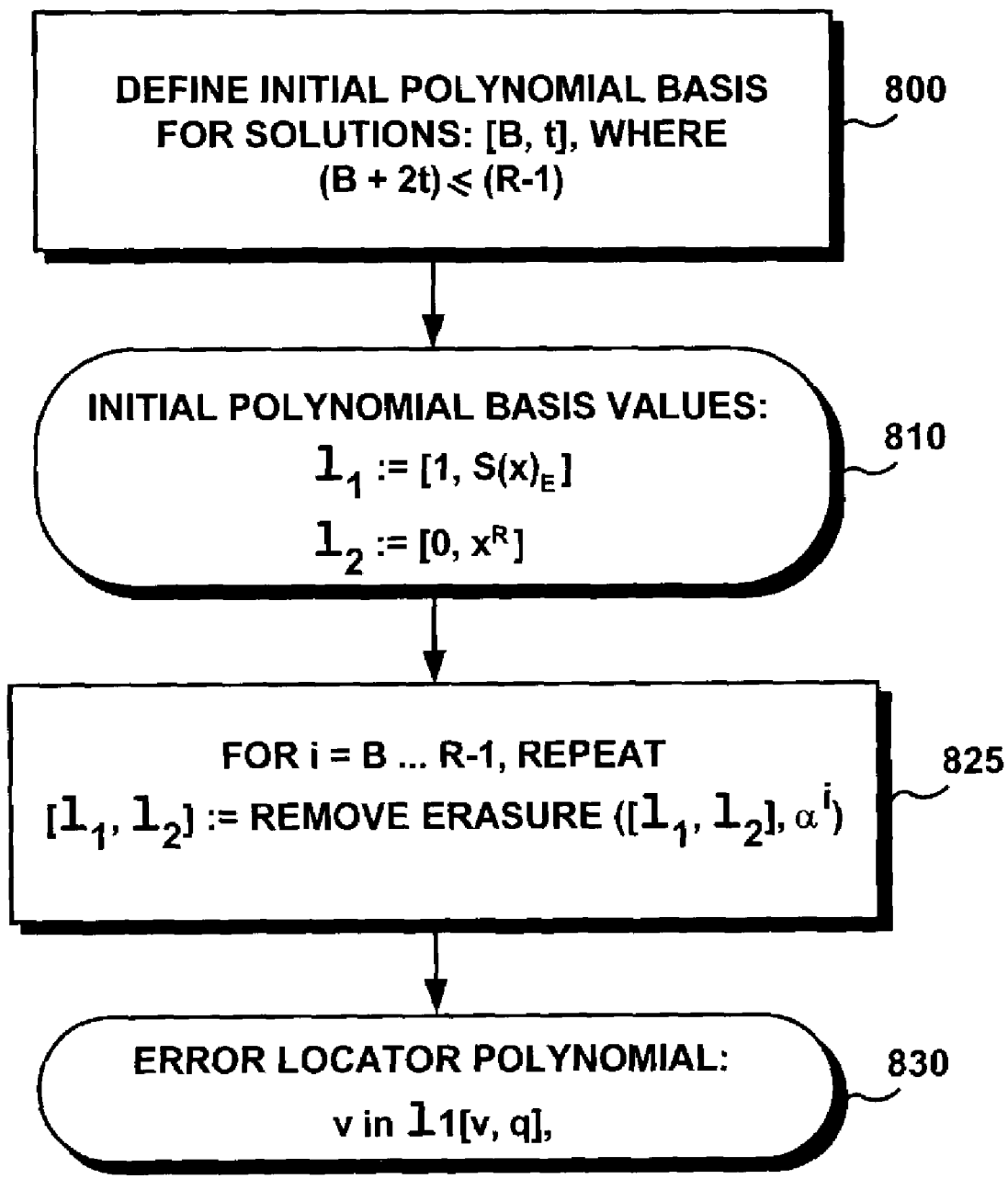
FIG. 8 is a more detailed functional flow chart that illustrates a continuation of the initialization stage by removing erasures in the decoding process of FIG. 5.

Referring now to FIG. 8, it provides additional details for the steps of removing (R−B) erasures (step 515) and calculating the error locator polynomial 830 (step 520). Decoder 200 presumes the initial existence of R erasures at the beginning of the failed sector being analyzed, for a burst of length B, and proceeds with the recursive removal of (R−B) erasures, in order to calculate the error locator polynomial 830.

To this end, decoder 200 starts at step 800 by defining initial polynomial basis values $[l_1, l_2]$ 810 for solutions [B, t], such that the following inequality is satisfied:

$$(B+2t) \leq (R-1), \quad (4)$$

$$l_1 := [1, S(x)_E], \text{ and} \quad (5)$$

$$l_2 := [0, x^R], \quad (6)$$

where each of $[l_1]$ and $[l_2]$ is a vector of two polynomials, and where B refers to the length of the burst of errors, and t refers to the total number of random errors within the same sector. As used herein, a "burst" is a contiguous sequence of bytes, many or all of which could be erasures; and "random errors" are individual bytes outside a burst, which are in error.

Figure 10:
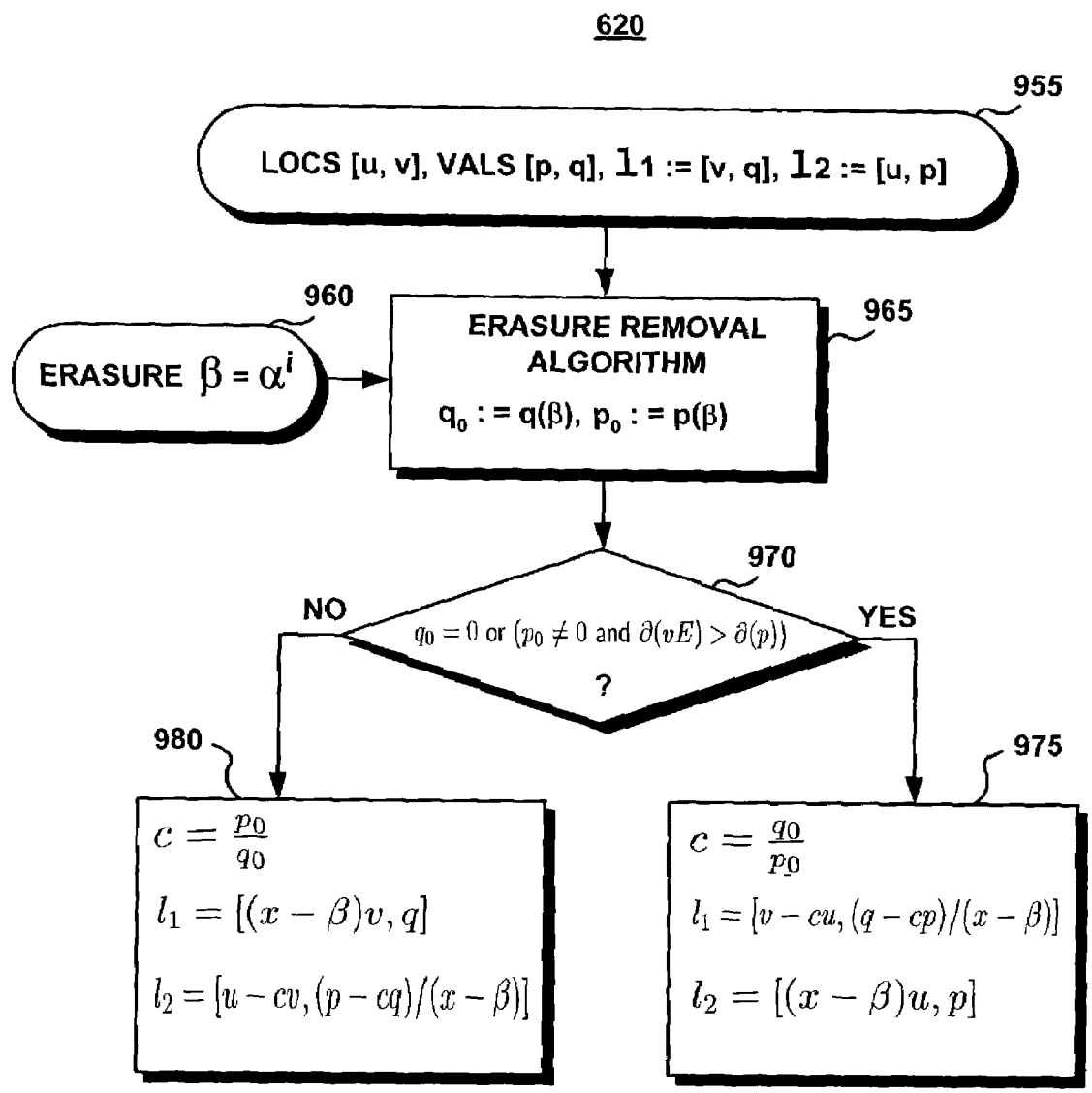
FIG. 10 is a much more detailed functional flow chart that illustrates a step for removing erasures in the process of FIG. 6.

The decoder 200 iterates the calculation of the initial polynomial basis values $[l_1, l_2]$ 810 for all the solutions [B, t] that satisfy the inequality (4) above, and removes the corresponding erasures, as expressed below:

$$\text{Repeat } [l_1, l_2] := \text{Remove Erasure } ([l_1, l_2], \alpha^i), \quad (7)$$

where i=B, . . . , (R−1), to generate an error locator polynomial v (830), which is the last value of v in $l_1[v, q]$ after (R−B) iterations of erasure removal steps, where each such removal step is illustrated in FIG. 10:

$$v \text{ in } l_1[v, q] \quad (8)$$

In the foregoing expressions, $[l_1]$ is comprised of the vectors [v, q], and $[l_2]$ is comprised of the vectors [u, p], as follows:

$$[l_1] = [v, q], \text{ and} \quad (9)$$

$$[l_2] = [u, p], \quad (10)$$

where v represents an error locator polynomial, q represents an error evaluation polynomial, u represents a previous error locator polynomial, and p represents a previous error evaluation polynomial.

Figure 5:
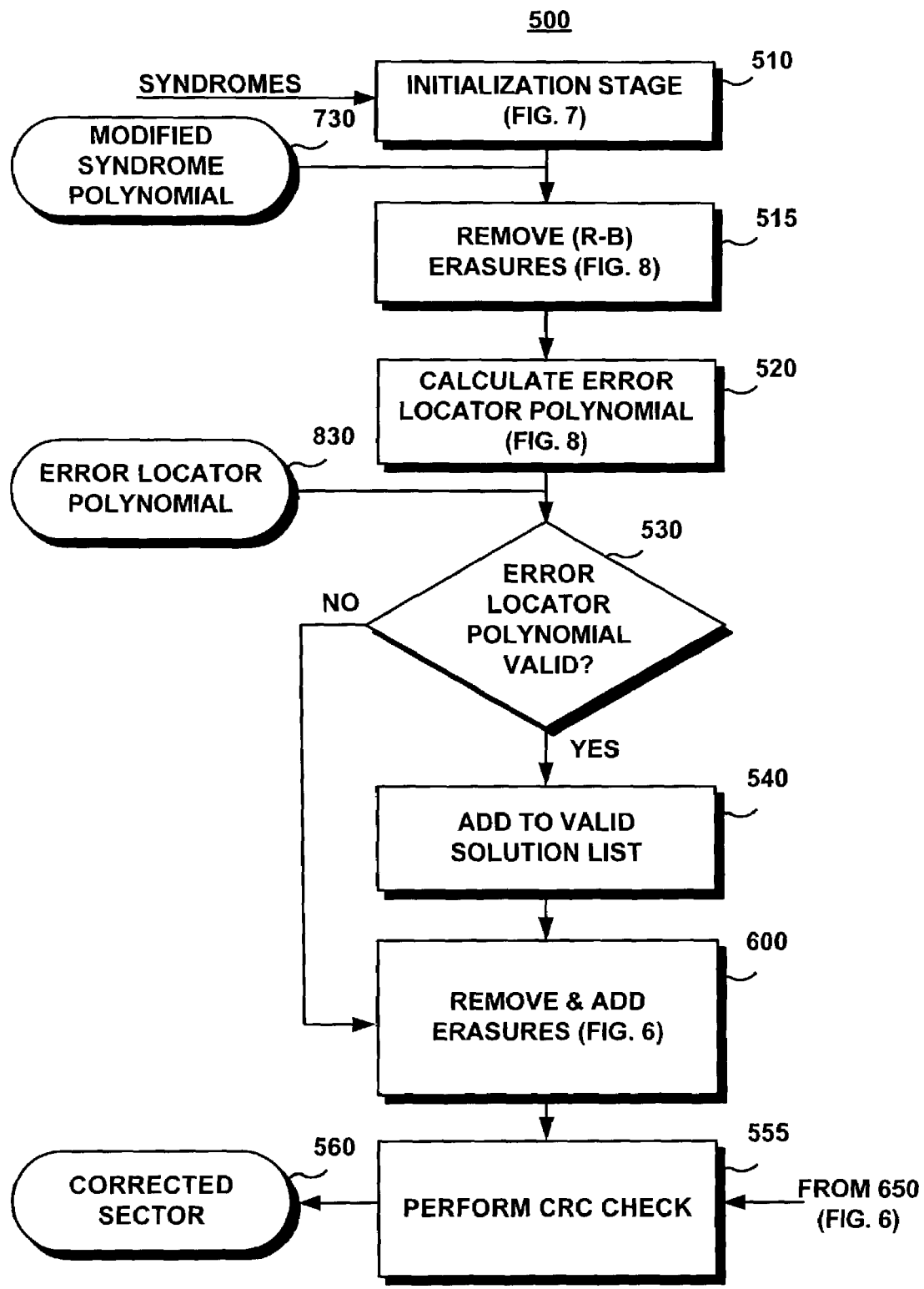
FIG. 5 is a high level functional flow chart that illustrates the mixed mode burst/random error decoding process implementation by the error correction code module of FIG. 4.
Figure 6:
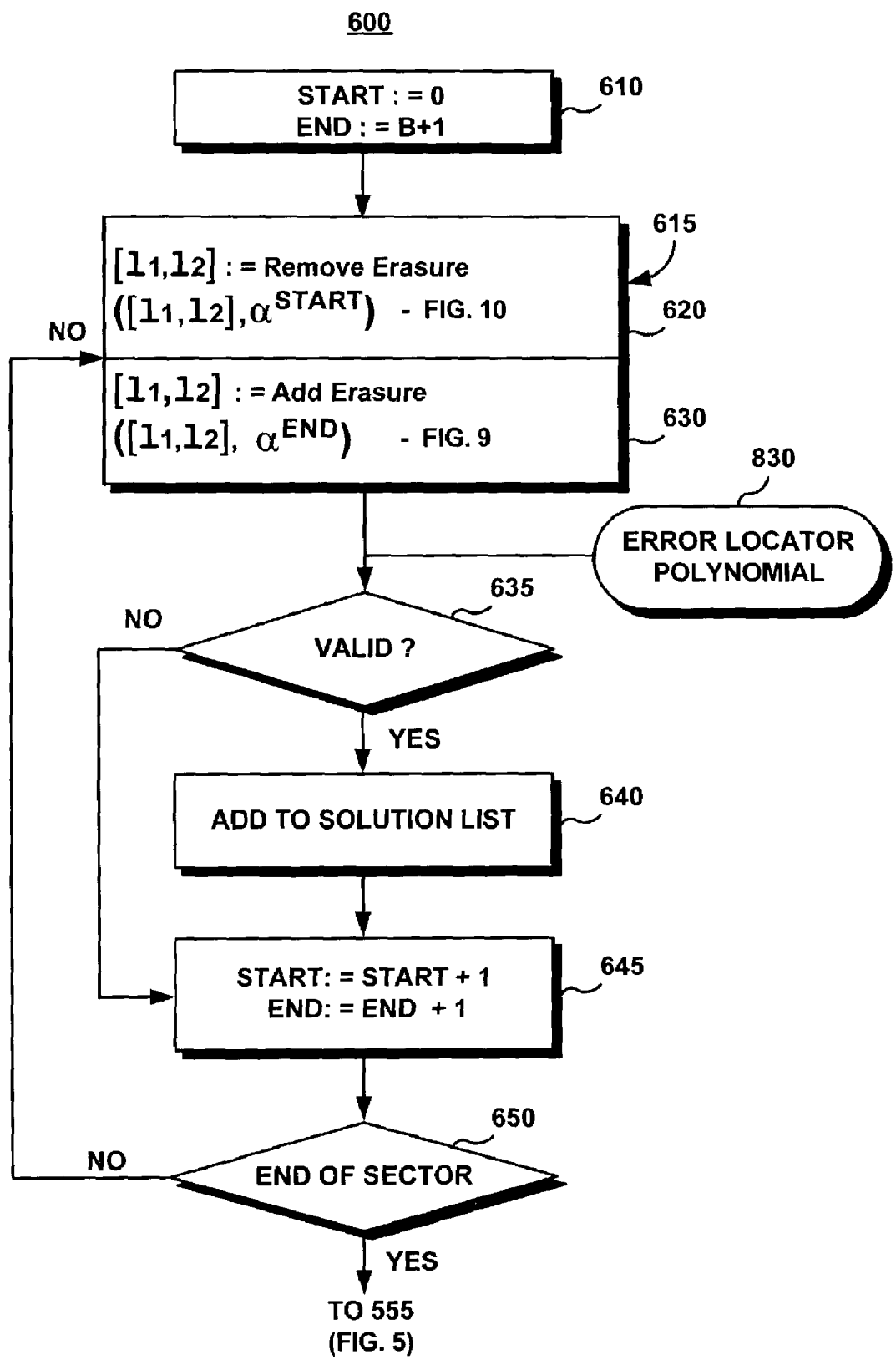
FIG. 6 is a more detailed functional flow chart that illustrates a step for removing and adding erasures in the decoding process of FIG. 5.

Having determined the initial error locator polynomial 830, the decoder 200 iteratively removes and adds the erasures, as indicated at step 600 of FIG. 5, as further detailed in FIG. 6. Method 600 starts at step 610 by initializing the burst location values "START" and "END," as follows:

$$\text{START}:=0, \text{ and END}:=B. \quad (11)$$

Figure 11:
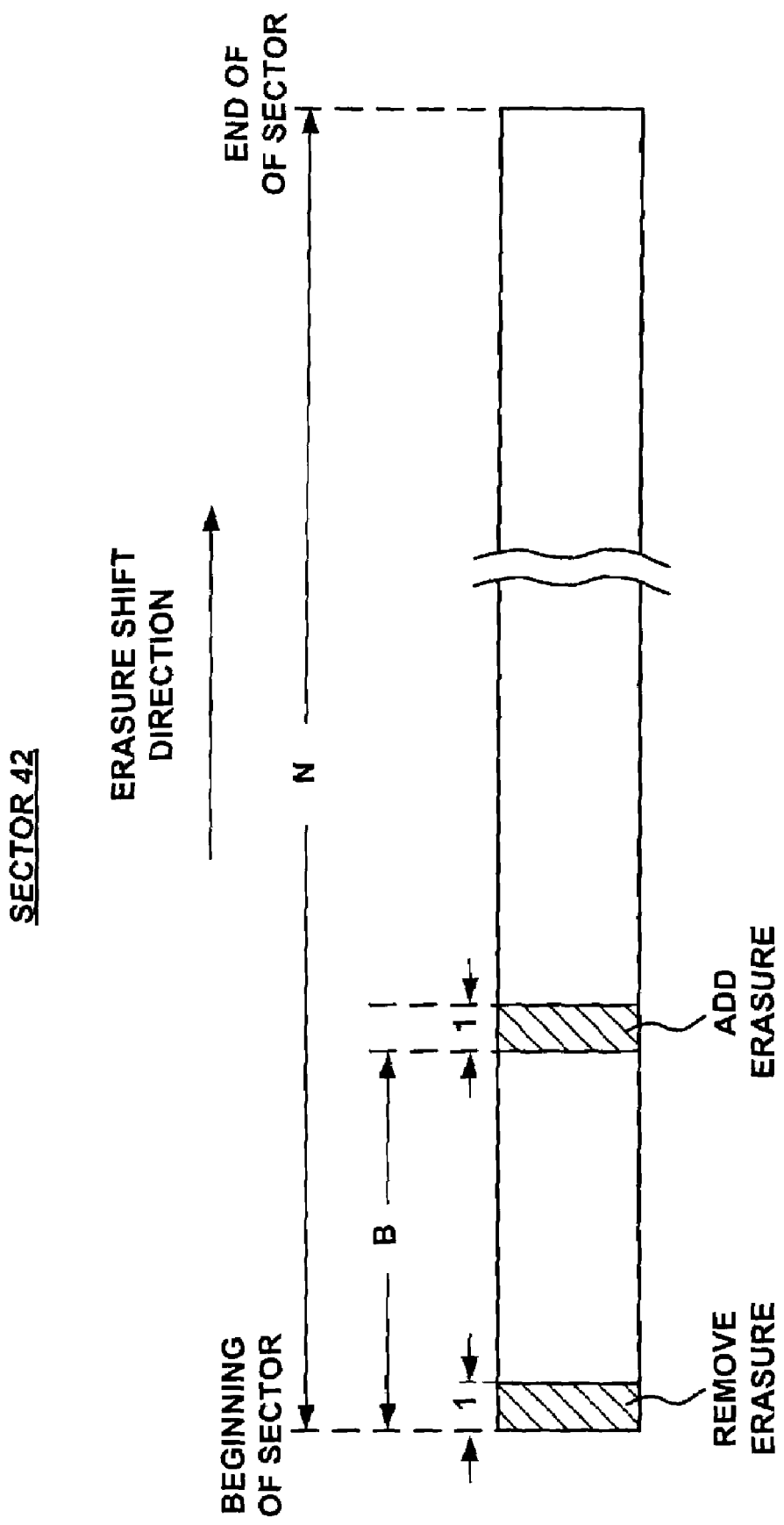
FIG. 11 is a fragmentary diagram of an exemplary sector being analyzed by the mixed mode burst/random error decoder of FIG. 4 according to the present invention.

With further reference to FIG. 11, method 600 then sequentially applies steps 620, 630 for shifting a byte erasure by removing it from an initial position along the sector 42, and then adding a byte erasure at the end, at a distance R from the initial erasure position. As it will be explained in more details, these two steps 620, 630 are reiterated (N−B) times until the entire sector 42 has been scanned.

With reference to FIGS. 6, 10, and 11, method 600 initiates the removal process (referenced by the numeral 620), causing the removal of an erasure of length 1 byte at the beginning of the sector 42. The removal process 620 starts at step 955 of FIG. 10 by using vectors LOCS [u, v], VALS [p, q], $l_1$, and $l_2$ as expressed below:

$$\text{LOCS } [u, v], \text{ VALS } [p, q], l_1 := [v, q], l_2 := [u, p] \quad (12)$$

At step 965, process 620 initiates an erasure removal algorithm by evaluating the polynomials $q_0$ and $p_0$, as expressed below:

$$q_0 := q(\beta), \text{ and} \quad (13)$$

$$p_0 := p(\beta), \quad (14)$$

wherein β refers to an erasure location that is set equal to $\alpha^i$, as follows: ($\beta = \alpha^i$). Process 620 then inquires at step 970 if the following condition is satisfied:

$$q_0 = 0, \text{ or } (p_0 \neq 0 \text{ and } \delta(vE) > \delta(p)), \quad (15)$$

where the function δ(.) denotes the polynomial degree.

In effect, using the above condition (15), with step 975 selected, method 620 creates a combination of vectors $l_1$ and $l_2$, to selectively eliminate the candidate erasure location β positions within the sector 42 from the valid solutions of the error evaluator polynomial, as follows:

$$c = q_0/p_0, \quad (16)$$

$$l_1 = [v-cu, (q-cp)/(x-\beta)], \text{ and} \quad (17)$$

$$l_2 = [(x-\beta)u, p], \quad (18)$$

where $q_0$ is the value of the error evaluation polynomial q at β=0, and $p_0$ is the value of the previous error evaluation polynomial p at β=0 (refer to expressions 13 and 14 above).

If at decision step 970 of FIG. 10, expression (15) is deemed not to be satisfied, process 620 proceeds to step 980 and sets value c and the vectors $[l_1]$ and $[l_2]$, as follows:

$$c = p_0/q_0, \quad (19)$$

$$l_1 = [(x-\beta)v, q], \text{ and} \quad (20)$$

$$l_2 = [u-cv, (p-cq)/(x-\beta)]. \quad (21)$$

Figure 9:
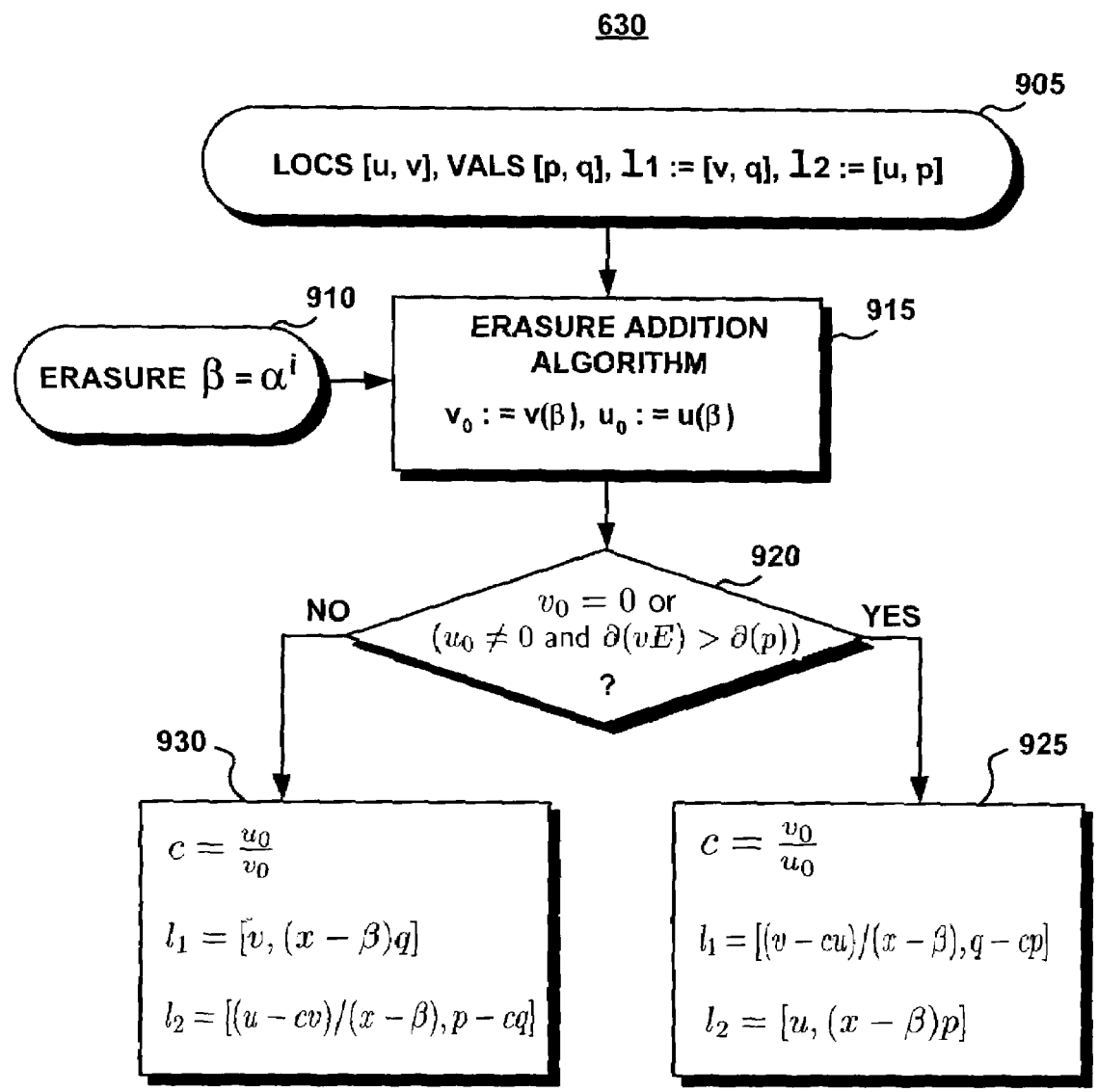
FIG. 9 is a much more detailed functional flow chart that illustrates a step for adding erasures in the process of FIG. 6.

With reference to FIGS. 6, 9, and 11, method 600 initiates the erasure addition process (referenced by the numeral 630), causing the addition of an erasure of length 1 byte at a distance R from the initial erasure position. The erasure and addition process completes the erasure shift process, and starts at step 905 of FIG. 9 by using vectors LOCS [u, v], VALS [p, q], $l_1$, and $l_2$ as expressed below:

$$\text{LOCS } [u, v], \text{ VALS } [p, q], l_1 := [v, q], l_2 := [u, p]. \quad (22)$$

At step 915, process 630 initiates an erasure addition algorithm by setting the polynomials $v_0$ and $u_0$, as expressed below:

$$v_0 := v(\beta), \text{ and} \quad (23)$$

$$u_0 := u(\beta), \quad (24)$$

wherein, as before, ($\beta=\alpha^i$). Process 630 then inquires at step 920 if the following condition is satisfied:

$$v_0=0, \text{ or } (u_0 \neq 0 \text{ and } \delta(vE) > \delta(p)). \quad (25)$$

In effect, using the above condition (25) and the result steps 925, 930, method 630 attempts to create a combination of vectors $l_1$ and $l_2$, to selectively eliminate the candidate erasure location $\beta$ positions within the sector 42 from the valid solutions of the error locator polynomial, i.e., it cannot be a random error location, as follows:

$$c = v_0/u_0, \quad (26)$$

$$l_1 = [(v-cu)/(x-\beta), q-cp], \text{ and} \quad (27)$$

$$l_2 = [u, (x-\beta)p]. \quad (28)$$

where $v_0$ is the value of the error evaluation polynomial v at $\beta=\alpha^i$, and $u_0$ is the value of the previous error evaluation polynomial u at $\beta=\alpha^i$ (refer to expressions 23 and 24 above).

If at decision step 920 of FIG. 9, expression (25) is deemed not to be satisfied, process 630 proceeds to step 930 and sets value c and the vectors $[l_1]$ and $[l_2]$, as follows:

$$c = u_0/v_0, \quad (29)$$

$$l_1 = [v, (x-\beta)q], \text{ and} \quad (30)$$

$$l_2 = [(u-cv)/(x-\beta), p-cq]. \quad (31)$$

Returning now to FIG. 6, after completing the erasure shifting step 615, which is comprised of the erasure removal step 620 and the erasure addition step 630, method 600 inquires at decision step 635, if the error locator polynomial 830 resulting from the erasure shifting step 615 is valid. If not, method 600 proceeds to step 645 where is increments the values "START" and "END" by an incremental step.

If at step 635 a determination is made that the error locator polynomial 830 is valid, method 600 proceeds to step 640 wherein it adds this error locator polynomial 830 to a solution list, and then proceeds to step 645 as described earlier. Subsequently, method 600 inquires at decision step 650 if the end of the sector 42 (FIG. 11) has been reached. If not, method 600 reiterates steps 615, 630, 640, 645, and 650, until the end of the sector 42 is reached, and then proceeds to step 555 of FIG. 5 as described earlier.

This iterative process is applied (N−B) times, where N is the number of bytes in the sector 42 resulting in a decoding latency that is a linear function of the number of check bytes, as set forth in the expression below:

$$\text{Decoding Latency} = 5R(N-B). \quad (32)$$

It is to be understood that the specific embodiments of the invention that have been described are merely illustrative of certain application of the principle of the present invention. Numerous modifications may be made to the mixed mode burst/random error decoder and associated decoding method described herein, without departing from the spirit and scope of the present invention. Moreover, while the present invention is described for illustration purpose only in relation to a data storage system, it should be clear that the invention is applicable as well to various communications and data processing systems.

What is claimed is:

1. An error correction algebraic decoding method for correcting a combination of a burst of errors and random errors in a failed sector, comprising:
   iteratively adding and removing an erasure (N−B) times until the entire failed sector has been scanned, where N denotes the number of bytes in the failed sector, and B denotes the length of the burst of errors in the failed sector;
   wherein (B+2t) is less than, or equal to (R−1), where R denotes the number of check bytes in the failed sector, where t denotes the total number of random errors in the failed sector,
   resulting in a corrected sector at a decoding latency that is a generally linear function of the number of the check bytes R, and wherein the decoding latency is expressed as follows:

decoding latency=5R (N−B).

2. The method of claim 1, further comprising applying an initialization stage for receiving a plurality of syndromes and for generating a modified syndrome polynomial from the plurality of syndromes.

3. The method of claim 2, further comprising iteratively removing (R−B) erasures, using the modified syndrome polynomial.

4. The method of claim 3, further comprising calculating an error locator polynomial, assuming the initial existence of R erasures at a beginning of the failed sector.

5. The method of claim 4, further comprising determining if the error locator polynomial is valid.

6. The method of claim 5, wherein if the error locator polynomial is valid, adding the error locator polynomial to a solution list.

7. The method of claim 1, further comprising performing a cyclic redundancy check; and
   selecting a valid burst and error locator and corresponding error values, to correct the failed sector.

8. The method of claim 3, wherein the initialization stage comprises calculating a syndrome polynomial S(x), as follows:

$$S(x) := \sum_{i=0}^{R-1} s_i x^{R-1-i},$$

where "i" denotes an index that goes from 0 to (R−1); and Si denotes an $i^{th}$ syndrome.

9. The method of claim 8, further comprising calculating an erasure polynomial E(x), as follows:

$$E(x) := \prod_{i=0}^{R-1} (x - \alpha^i),$$

where $\alpha^i$ refers to a Galois Field representation of symbol values and locations.

10. The method of claim 9, further comprising calculating a modified syndrome polynomial $S(x)_E$, as follows:

$$S(x)_E := [E(x)*S(x)] \mod x^R,$$

resulting in the modified syndrome polynomial.

11. The method of claim 10, wherein iteratively removing (R−B) erasures comprises calculating initial polynomial basis values $[l_1, l_2]$ for solutions [B, t], as follows:

$$l_1 := [1, S(x)_E], \text{ and}$$

$$l_2 := [0, x^R],$$

where each of $[l_1]$ and $[l_2]$ is a vector of two polynomials.

12. The method of claim 11, further comprising iteratively calculating the initial polynomial basis values $[l_1, l_2]$ for all solutions [B, t], and removing corresponding erasures, as follows:

for i=B, . . . , R−1, $[l_1, l_2]$:=Remove Erasure ($[l_1, l_2], \alpha^i$); and wherein $[l_1]$ is comprised of vectors [v, q], and $[l_2]$ is comprised of vectors [u, p], as follows:

$[l_1]=[v, q]$, and $[l_2]=[u, p]$, where v represents an error locator polynomial, q represents an error evaluation polynomial, u represents a previous error locator polynomial, and p represents a previous error evaluation polynomial.

13. The method of claim 4, wherein iteratively adding and removing the erasure (N−B) times comprises sequentially removing an erasure and adding an erasure for shifting a byte erasure.

14. The method of claim 13, wherein shifting the byte erasure comprises removing the byte erasure from an initial position along the failed sector.

15. The method of claim 14, wherein shifting the byte erasure further comprises adding a byte erasure at a distance R from the initial position.

16. The method of claim 15, wherein removing the byte erasure further comprises evaluating polynomials $q_0$ and $p_0$, as expressed below:

$q_0:=q(\beta)$, $p_0:=p(\beta)$, and $\beta=\alpha^i$, wherein β refers to an erasure location that is set equal to $\alpha^i$.

17. The method of claim 16, wherein removing the byte erasure further comprises inquiring if the following erasure removal condition is satisfied:

$q_0=0$, or ($p_0 \neq 0$ and $\delta(vE) > \delta(p)$), where the function δ(.) denotes a polynomial degree.

18. The method of claim 17, wherein if the erasure removal condition is satisfied, creating a combination of vectors $l_1$ and $l_2$, to selectively eliminate candidate erasure location β positions within the failed sector from valid solutions of an error evaluator polynomial, as follows:

$c=q_0/p_0$, $l_1=[v-cu, (q-cp)/(x-\beta)]$, and $l_2=[(x-\beta)u, p]$, where $q_0$ denotes a value of the error evaluation polynomial q at $\beta=\alpha^i$, and $p_0$ denotes a value of a previous error evaluation polynomial p at $\beta=\alpha^i$.

19. The method of claim 17, wherein if the erasure removal condition is not satisfied, setting a value c and vectors $[l_1]$ and $[l_2]$, as follows:

$c=p_0/q_0$, $l_1=[(x-\beta)v, q]$, and $l_2=[u-cv, (p-cq)/(x-\beta)]$.

20. The method of claim 17, wherein adding the byte erasure comprises using vectors.

21. The method of claim 20, wherein adding the byte erasure comprises setting polynomials $v_0$ and $u_0$, as expressed below:

$v_0:=v(\beta)$, $u_0:=u(\beta)$, and $\beta=\alpha^i$.

22. The method of claim 21, wherein adding the byte erasure further comprises determining if the following erasure addition condition is satisfied:

$v_0=0$, or ($u_0 \neq 0$ and $\delta(vE) > \delta(p)$).

23. The method of claim 22, wherein if the erasure addition condition is satisfied, creating a combination of vectors $l_1$ and $l_2$, to selectively eliminate candidate erasure location β positions within the failed sector from valid solutions of the error locator polynomial, as follows:

$c=v_0/u_0$, $l_1=[(v-cu)/(x-\beta), q-cp]$, and $l_2=[u, (x-\beta)p]$.

where $v_0$ is a value of the error evaluation polynomial v at $\beta=\alpha^i$, and $u_0$ is a value of a previous error evaluation polynomial u at $\beta=\alpha^i$.

24. The method of claim 22, wherein if the erasure addition condition is not satisfied, setting a value c and vectors $[l_1]$ and $[l_2]$, as follows:

$c=v_0/u_0$, $l_1=[v, (x-\beta)q]$, and $l_2=[(v-cu)/(x-\beta), p-cq]$.

25. An error correction algebraic decoder for correcting a combination of a burst of errors and random errors in a failed sector, comprising:

a first set of instruction codes for iteratively adding and removing an erasure (N−B) times until the entire failed sector has been scanned, where N denotes the number of bytes in the failed sector, and B denotes the length of the burst of errors in the failed sector; and wherein (B+2t) is less than, or equal to (R−1), where R denotes the number of check bytes in the failed sector, where t denotes the total number of random errors in the failed sector, resulting in a corrected sector at a decoding latency that is a generally linear function of the number of the check bytes R, and wherein the decoding latency is expressed as follows:

decoding latency=5R (N−B).

26. The decoder of claim 25, further comprising a second set of instruction codes for applying an initialization stage, to receive a plurality of syndromes and to generate a modified syndrome polynomial from the plurality of syndromes.

27. The decoder of claim 26, further comprising a third set of instruction codes for iteratively removing (R−B) erasures, using the modified syndrome polynomial.

28. The decoder of claim 27, further comprising a fourth set of instruction codes for calculating an error locator polynomial, presuming the initial existence of R erasures at a beginning of the failed sector.

29. The decoder of claim 28, wherein if the error locator polynomial is valid, the error locator polynomial is added to a solution list.

30. The decoder of claim 25, further comprising a fifth set of instruction codes for performing a cyclic redundancy check, and for selecting a valid burst and error locator and corresponding error values, to generate the corrected sector.

31. An error correction decoder for correcting a combination of a burst of errors and random errors in a failed sector, comprising:
   means for iteratively adding and removing an erasure (N−B) times until the entire failed sector has been scanned, where N denotes the number of bytes in the failed sector, and B denotes the length of the burst of errors in the failed sector; and
   wherein (B+2t) is less than, or equal to (R−1), where R denotes the number of check bytes in the failed sector, where t denotes the total number of random errors in the failed sector,
   resulting in a corrected sector at a decoding latency that is a generally linear function of the number of the check bytes R, and wherein the decoding latency is expressed as follows:

decoding latency=5R (*N−B*).

32. The decoder of claim 31, further comprising means for applying an initialization stage, to receive a plurality of syndromes and to generate a modified syndrome polynomial from the plurality of syndromes.

33. The decoder of claim 32, further comprising means for removing (R−B) erasures, using the modified syndrome polynomial.

34. The decoder of claim 33, further comprising means for calculating an error locator polynomial, presuming the initial existence of R erasures at a beginning of the failed sector.

35. The decoder of claim 34, wherein if the error locator polynomial is valid, adding the error locator polynomial is added to a solution list.

36. The decoder of claim 31, further comprising means for performing a cyclic redundancy check, and for selecting a valid burst and error locator and corresponding error values, to generate the corrected sector.

37. An error correction algebraic decoding method for correcting a combination of a burst of errors and random errors in a failed sector, comprising:
   iteratively adding and removing an erasure (N−B) times until the entire failed sector has been scanned, where N denotes the number of bytes in the failed sector, and B denotes the length of the burst of errors in the failed sector; and
   wherein (B+2t) is less than, or equal to (R−1), where R denotes the number of check bytes in the failed sector, where t denotes the total number of random errors in the failed sector, resulting in a corrected sector, and wherein the decoding latency is expressed as fallows:

decoding latency=5(*N−B*).

* * * * *